United States Patent [19]

Scally et al.

[11] Patent Number: 4,944,190
[45] Date of Patent: Jul. 31, 1990

[54] FLOW METER

[75] Inventors: Henry A. Scally, Lederach; Harold L. Gingrich, Norristown, both of Pa.

[73] Assignee: Ametek Corporation, New York, N.Y.

[21] Appl. No.: 246,099

[22] Filed: Sep. 19, 1988

[51] Int. Cl.$^5$ .............................................. G01F 1/22
[52] U.S. Cl. ............................... 73/861.58; 73/861.56
[58] Field of Search ........... 73/861.02, 861.44, 861.45, 73/861.55, 861.56, 861.58, 861.51, DIG. 4, 861.57, 861.48; 340/610, 623

[56] References Cited

U.S. PATENT DOCUMENTS

| | | | |
|---|---|---|---|
| 3,147,619 | 9/1964 | Whitacre | 73/861.56 |
| 3,164,989 | 1/1965 | Busillo et al. | 73/861.56 |
| 3,729,996 | 5/1973 | Metz | 73/861.77 |
| 3,960,142 | 6/1976 | Elliott et al. | 73/861.42 |
| 4,059,015 | 11/1977 | Satori | 73/861.56 |
| 4,254,664 | 3/1981 | Graham | 73/861.58 |
| 4,263,813 | 4/1981 | Gryn | 73/861.56 |
| 4,507,976 | 4/1985 | Banko | 73/DIG. 3 |
| 4,523,480 | 6/1985 | Inoue | 73/861.56 |
| 4,554,494 | 11/1985 | Howeth | 340/623 |

FOREIGN PATENT DOCUMENTS 3411156  10/1985  Fed. Rep. of Germany ... 73/861.56

Primary Examiner—Joseph A. Orsino
Assistant Examiner—Brent A. Swarthout
Attorney, Agent, or Firm—Ratner & Prestia

[57] ABSTRACT

A fluid flow meter is disclosed which can generate both an electrical and a mechanical representation of flow rate. A first magnet, mounted within a flow tube, is displaced in response to fluid flow in the flow tube. A second magnet, mounted outside the flow tube, moves in response to changes in the magnetic coupling between the first magnet and the second magnet caused by displacement of the first magnet within the flow tube. A pointer is coupled to the second magnet and moves with the second magnet to produce a visual representation of flow rate. A sensor, mounted in proximity to the second magnet, and responsive to movement of the second magnet, produces an electrical signal representative of the flow rate.

4 Claims, 3 Drawing Sheets

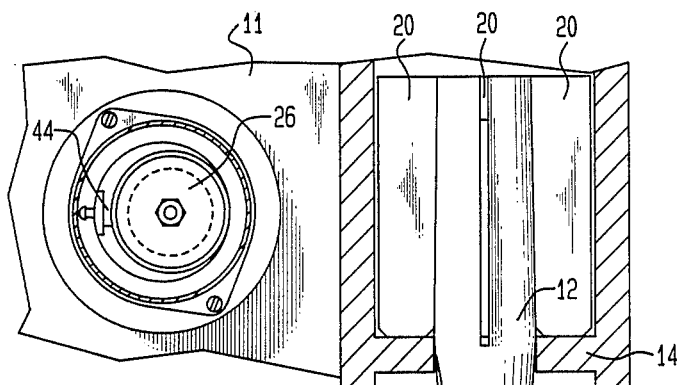
FIG. 2
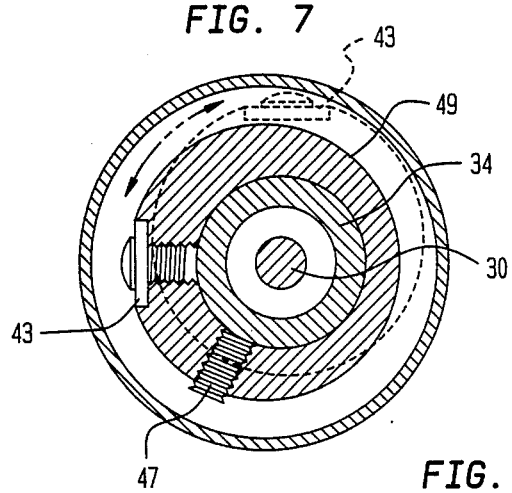
FIG. 7
FIG. 4
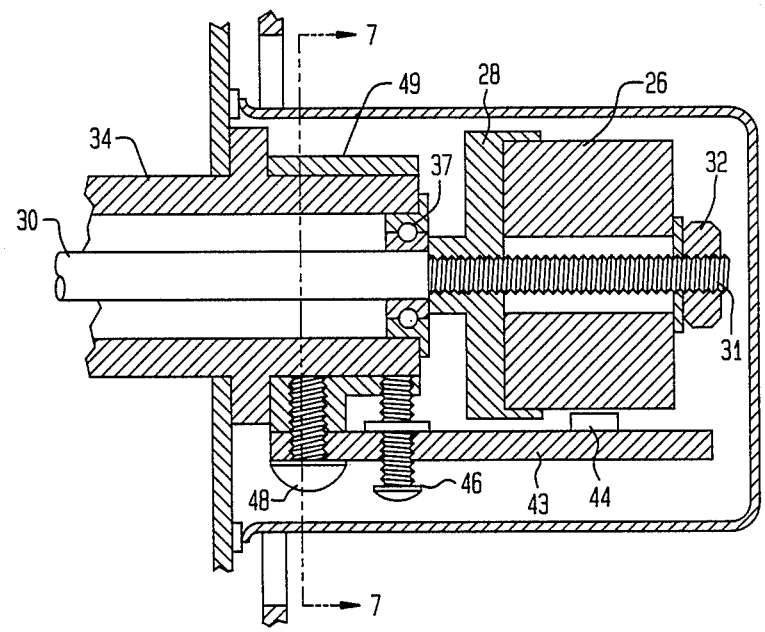

FLOW METER

FIELD OF THE INVENTION

The present invention relates, in general, to sensor apparatus for developing indications of the rate of fluid flow within a flow passage and, in particular, to a system which generates representations of flow rate mechanically as well as electronically.

BACKGROUND OF THE INVENTION

Many types of meters have been developed for measuring the flow of a medium within a pipe or other flow passage. One common type of flow meter uses a sensor external to the flow passage for responding to movement of a part within the flow passage to produce an electrical signal from which a representation of flow rate is developed.

U.S. Pat. No. 3,729,996 discloses a flow meter that includes a shaft which rotates within the flow passage at a rate proportional to the rate of fluid flow. A second shaft outside the flow passage and magnetically coupled to the first shaft rotates with the first shaft. An electrical circuit converts the rotation rate of the second shaft into a visual output.

In another type of flow meter, such as that disclosed in U.S. Pat. No. 4,507,976, Hall effect sensors respond directly to displacement of a magnet within the flow passage. The Hall effect sensor develops a signal based on the magnitude of the component of magnetic flux perpendicular to the face of the sensor, which varies with displacement of the magnet. As with the prior art discussed above, the design of this flow meter includes electrical circuitry which converts the output of the sensor into a visual representation of flow rate.

DISCLOSURE OF THE INVENTION

A flow meter, constructed in accordance with the present invention, includes a flow tube adapted for connection into a fluid flow passage through which a fluid flow to be measured passes. A first magnet is mounted in the flow tube for movement in response to fluid flow in the flow tube. A second magnet is mounted outside the flow tube in proximity to the first magnet for movement of the second magnet in response to changes in the magnetic coupling between the first and the second magnets caused by movement of the first magnet. A pointer is mounted for movement with the second magnet and a scale is mounted in proximity to the pointer for developing a visual indication representative of the rate of fluid flow from movement of the second magnet caused by movement of the first magnet. A sensor is mounted in proximity to the second magnet to develop an electrical signal representative of the rate of fluid flow from changes in the magnetic flux density in proximity to the second magnet caused by movement of the second magnet in response to movement of the first magnet.

According to a second aspect of the invention, the second magnet is cylindrical and the sensor generates a voltage output signal having a sinusoidally varying amplitude dependent upon the angle of rotational displacement of the cylindrical magnet. This voltage output signal varies substantially linearly with the angle of rotational displacement of the cylindrical magnet over a limited range of rotational displacement of the cylindrical magnet. The sensor is mounted within a collar which has a rotation axis parallel to the axis of rotation of the cylindrical magnet. The collar is adjusted for positioning the sensor in proximity to the cylindrical magnet and at a point on the circumference of the cylindrical magnet for producing a substantially linear voltage output signal for the limited range of rotation of the cylindrical magnet as it is rotationally displaced in response to movement of the magnetic float within the flow tube.

BRIEF DESCRIPTION OF THE DRAWINGS

FIG. 2 is a sectional view taken along line 2—2 of FIG. 1 showing the orientation of the components of the flow meter in the absence of any fluid flow.

FIG. 4 is a sectional view taken along line 4—4 of FIG. 3.

FIG. 7 is a sectional view taken along line 7—7 of FIG. 4.

DETAILED DESCRIPTION OF THE INVENTION

Figure 1:
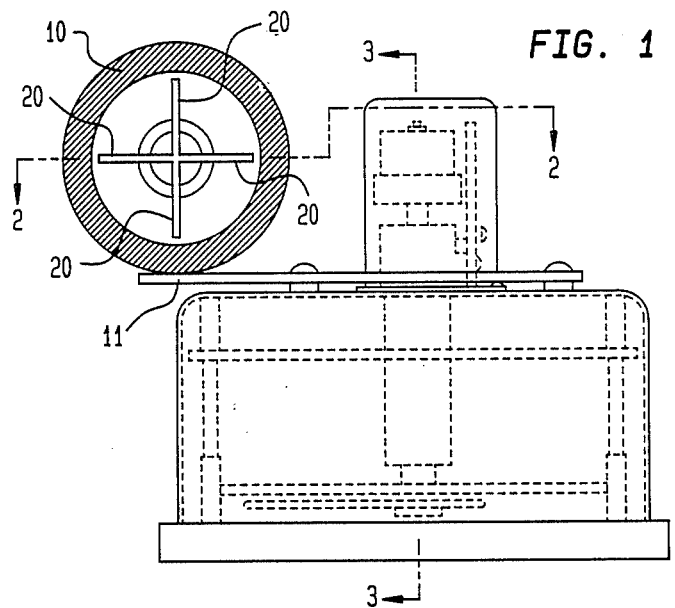
FIG. 1 is a top view of a preferred embodiment of a flow meter constructed in accordance with the present invention.

Referring to FIG. 1 and FIG. 2, a flow meter constructed in accordance with the present invention includes a flow tube 10 comprising any hollow pipe-like device that would allow passage of a fluid flow. Flow tube 10 has ends (not shown) adapted for connection into a fluid flow passage. For example, the ends of tube 10 may be threaded. Flow tube 10 is joined to the remainder of the flow meter by means of an indicator support plate 11.

A first magnet 12 is mounted inside flow tube 10 by means of a shelf 14 which extends across the flow tube. The shape of magnet 12 provides the floating properties that allow magnet 12 to function as a magnetic float and be displaced within flow tube 10 in response to fluid flow through the flow tube. In the absence of any fluid flowing through flow tube 10, a tapered end 16 of magnet 12 hangs below the top of shelf 14 and through an opening 17 in shelf 14. A finned end 18 of magnet 12, including four fins 20, sits on the top of shelf 14, thereby holding the first magnet at a predetermined rest position. The junction between finned end 18 and tapered end 16 of magnet 12 rests at the top edge of opening 17 in shelf 14 and is approximately the same size as opening 17.

As fluid flows in the direction shown by arrows 22, magnet 12, in its rest position prevents fluid from passing through opening 17 in shelf 14, thus creating pressure at opening 17. If this pressure creates a force on magnet 12 greater than the gravitational force holding magnet 12 at its rest position on shelf 14, magnet 12 will be lifted from its rest position and displaced in the direction of fluid flow. Because of the design of magnet 12, and specifically tapered end 16, a gap forms at opening 17 in shelf 14 as magnet 12 is displaced in the direction of fluid flow thus decreasing the pressure at opening 17. The displacement of magnet 12 in flow tube 10 will continue until an equilibrium distance is reached. At this equilibrium distance the force caused by pressure due to fluid flowing through the opening 17 in flow tube 10 has decreased to where it is balanced by the gravitational force on magnet 12.

As the rate of fluid flow through flow tube 10 increases, the equilibrium distance will be further along the flow path from the original resting place of the magnet 12. The equilibrium distance of magnet 12, for the flow meter of the present embodiment, can be limited, for example, to approximately 2 inches from its original resting place for the maximum flow that this flow meter is designed to measure.

Figure 3:
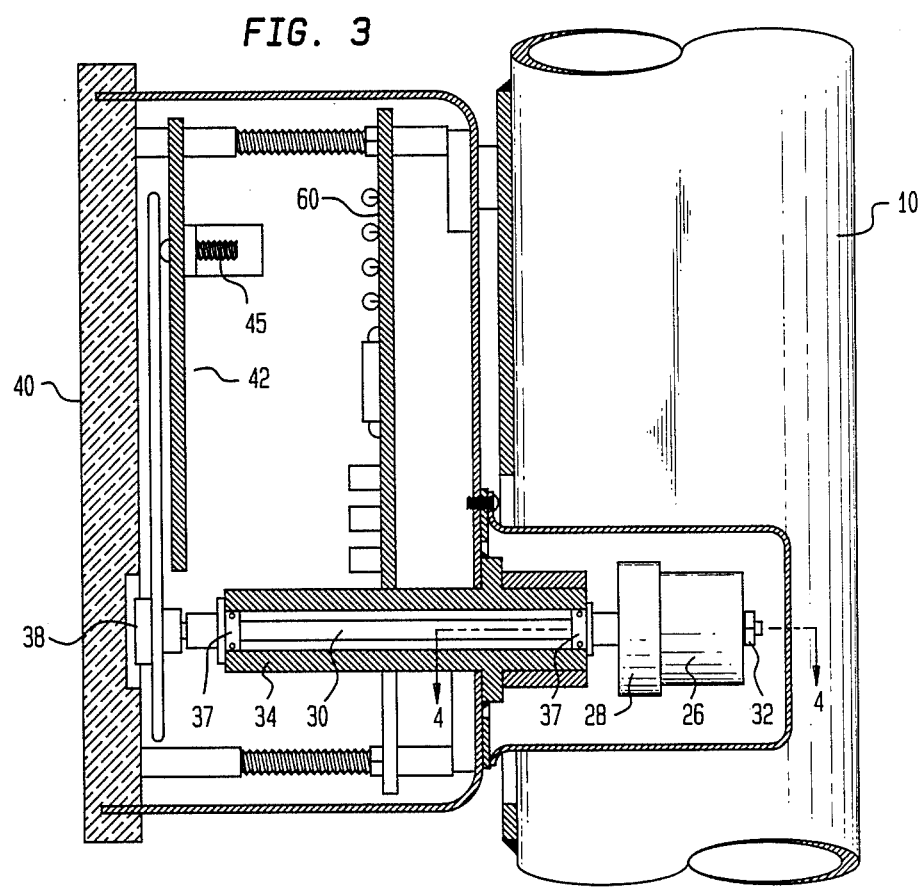
FIG. 3 is a sectional view taken along line 3—3 of FIG. 1.
Figure 5:
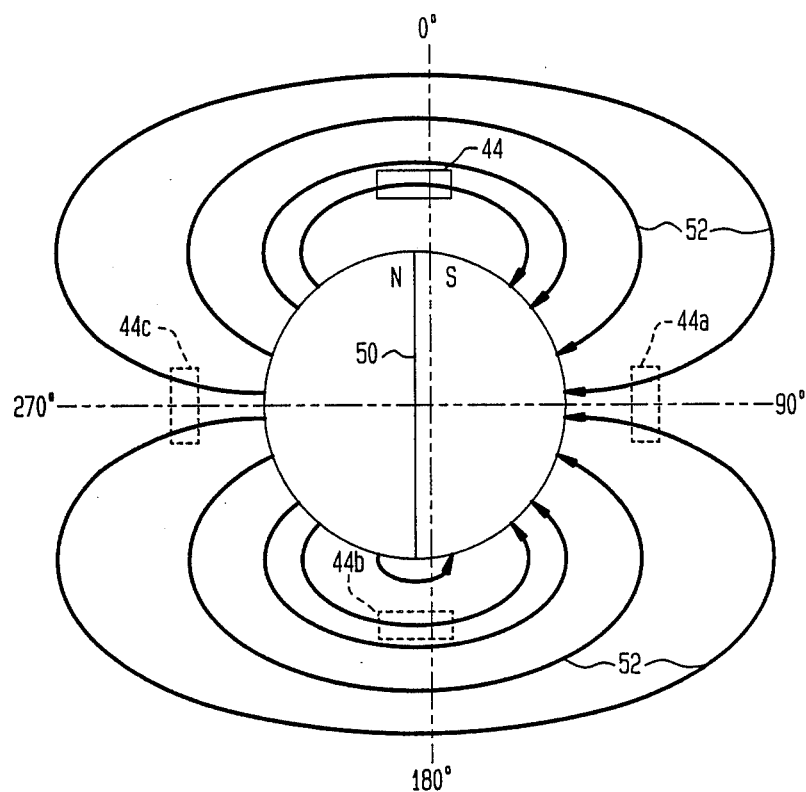
FIG. 5 is a diagrammatic representation of the magnetic field associated with a cylindrical bipolar magnet.

Referring now to FIG. 3 and FIG. 4, a second magnet 26, fitted within a magnet guide 28, is mounted on a shaft 30 with its axis coincident with the axis of the shaft by means of a threaded shaft extension 31 and a nut 32. Magnet 26 is mounted in this way near flow tube 10 and in proximity to magnet 12, thereby creating a magnetic coupling between magnet 12 and magnet 26. For the embodiment of the invention illustrated, magnet 26 is cylindrical and bipolar, with a north pole/south pole orientation as shown in FIG. 5. Shaft 30 sits within a bearing housing 34 and is supported by a pair of bearings 37 which allow shaft 30, with magnet 26, to rotate freely.

As magnet 12 is lifted in flow tube 10 in the direction of fluid flow as previously described, magnet 26 rotates with shaft 30 in response to changes in the magnetic coupling between magnet 12 and magnet 26 caused by movement of magnet 12. A pointer 38 is mounted on shaft 30 and rotates with shaft 30 and magnet 26. A cover assembly 40 allows for viewing of pointer 38 as it moves across a scale 42 which is held in place behind pointer 38 by a screw 45. As magnet 12 is lifted in flow tube 10, causing magnet 26 to rotate, pointer 38 rotates with magnet 26 to an indication on scale 42 representative of the flow rate within flow tube 10.

FIG. 4 and FIG. 7 show a Hall effect sensor assembly including a PC board 43, a Hall effect unit 44, a clearance adjustment screw 46, a rotation adjustment set screw 47, a fastening screw 48 and an eccentric collar 49. Hall effect unit 44 is mounted on PC board 43 which is fastened to eccentric adjustment collar 49 by means of fastening screw 48. Clearance adjustment screw 46 allows setting the gap between magnet 26 and Hall effect unit 44.

Figure 6:
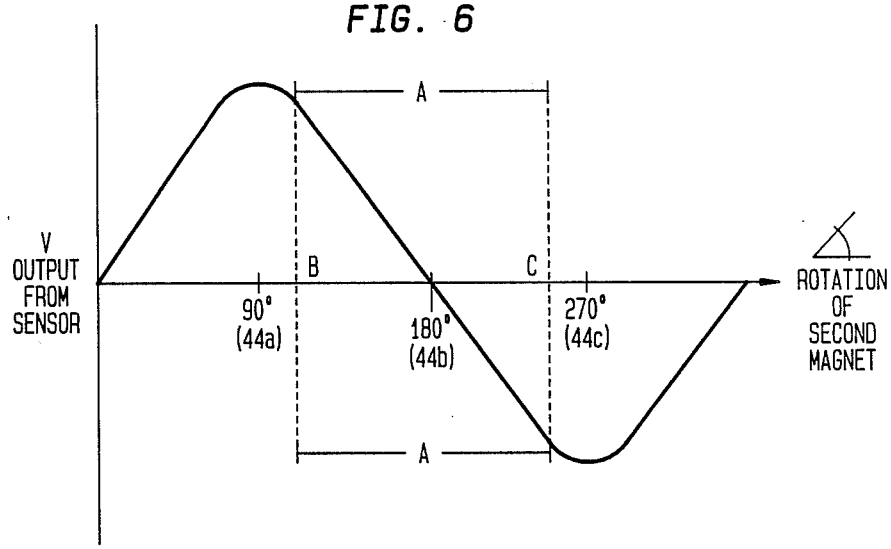
FIG. 6 is a waveform showing the full range of outputs of a Hall effect sensor and the range of operation of a Hall effect sensor used in the flow meter of FIG. 1.

As magnet 26 rotates in response to changes in the magnetic coupling between magnet 12 and magnet 26 caused by movement of magnet 12 in response to fluid flow, the magnetic flux sensed by Hall effect unit 44 changes. This relationship between angle of rotation of magnet 26 and the output signal from Hall effect unit 44 is shown in FIG. 5 and FIG. 6. Magnet 26 is shown "end on" in FIG. 5 with north/south polar division 50 and magnetic flux lines 52 extending from one pole to the other. For the sake of explanation, three Hall effect units 44a, 44b and 44c are shown to represent the sensor location with respect to the polar north/south division 50 of magnet 26 as magnet 26 undergoes the rotation described above.

The Hall effect unit 44 produces a voltage output which is a function of the angle at which magnetic flux lines 52 impinge upon the face of the Hall effect unit. When magnetic flux lines 52 impinge upon the face of Hall effect unit 44 at an angle that is virtually perpendicular to the face of the Hall effect unit 44, the voltage output is a maximum. This is depicted by Hall effect unit 44a which corresponds to a 90° clockwise rotation of magnet 26. When magnetic flux lines 52 impinge upon Hall effect unit 44 at an angle that is virtually parallel to the face of the Hall effect unit, the voltage output of the Hall effect unit is approximately zero. This is depicted by Hall effect unit 44b and corresponds to a 180° clockwise rotation of magnet 26.

The Hall effect sensor voltage output for one full rotation of magnet 26 as a function of the angle of rotation of magnet 26 is shown in FIG. 6. As can be seen from FIG. 6, this output voltage is a sine wave. If magnet 26 rotates with respect to Hall effect unit 44 only over the angle of rotation between angular positions "B" and "C", a substantially linear relationship may be provided between the angle of rotation of magnet 26 and the voltage output of Hall effect unit 44. This linear range is highlighted in FIG. 6 by the area marked "A" and can correspond, for example, to approximately 100° of rotation of magnet 6.

In order to produce an output which varies linearly with the flow rate in flow tube 10, Hall effect unit 44 is mounted such that as magnet 26 rotates in response to the displacement of magnet 12 within flow tube 10, the output produced by Hall effect unit 44 will be restricted to the angular range marked "A" in FIG. 6. By mounting Hall effect unit 44 in this way, the sensor output will be substantially linear with respect to rotational displacement of magnet 26. Also, since the rotational displacement of magnet 26 will extend only over range "A", namely about 100°, scale 42 and pointer 38, when mounted on shaft 30, will operate over the same range such that pointer 38 only traces an arc on scale 42 corresponding to range "A". Scale 42 is calibrated so that the whole range of flow rates for measurement by this device can be traced by an arc of pointer 38 corresponding to range "A".

The positioning of the Hall effect unit 44 with respect to magnet 26 to limit operation to range "A" will be explained with reference to FIG. 6 and FIG. 7. This procedure is followed for each magnet 12/magnet 26 combination since individual magnets can be somewhat different. First, the north/south polar division 50 of magnet 26 is located. This division may be marked on the magnet 26 using conventional means before mounting the magnet in the flow meter. Alternatively, the operator may locate the north/south polar division on the circumference of magnet 26 while it is in place in the flow meter by adjusting the position of Hall effect unit 44 to the point on the circumference of magnet 26 where the voltage output of the sensor is zero. As can be seen from the waveform of FIG. 6, this point on the circumference of magnet 26 of zero voltage output from Hall effect unit 44 corresponds to the north/south polar division of cylindrical magnet 26.

Adjustment of the position of Hall effect unit 44 with respect to magnet 26 is performed by use of eccentric collar 49, which has a rotation axis parallel to the axis of rotation of magnet 26. Hall effect unit 44 and PC board 43 are fastened to eccentric collar 49 by fastening screw 48 as described above.

In order to operate in the full linear range marked "A" in FIG. 6, the point of zero voltage output from Hall effect unit 44 will correspond to the midpoint of the allowed range of rotation of magnet 26. This point is therefore assigned the midpoint of the range of flow rates to be measured by this flow meter. In order to cover the full range of flow rates, Hall effect unit 44 is backed away along the circumference of cylindrical magnet 26 from the zero point, approximately 50° or half the range marked "A" in FIG. 7 by turning collar 49. This will position Hall effect unit 44 at the point on the circumference of magnet 26 corresponding to the angular position marked "B" in the waveform of FIG. 6. With collar 49 at this position, rotation adjustment set screw 47 is tightened to lock the collar at this position. With Hall effect unit 44 mounted at angular position "B" in FIG. 6, , a clockwise rotation of approximately 100° of magnet 26 will cause the voltage output signal of Hall effect unit 44 to trace the substantially linear path shown in range "A" of FIG. 6.

The voltage output of Hall effect unit 44 can be further linearized by use of an electronic circuit represented by reference numeral 60 in FIG. 3. The output signal from circuit 60 can be used to develop a readout of flow rate at a remote location or as a signal for controlling the operation of a component such as a valve.

While this invention has been described with reference to specific, and particularly preferred, embodiments thereof, it is not limited thereto and the appended claims are intended to be construed to encompass not only the specific forms and variants of the invention shown, but to such other forms and variants as may be devised by those skilled in the art without departing from the true spirit and scope of this invention.

We claim:

1. A flow meter comprising:
   a flow tube adapted for connection into a fluid flow passage through which a fluid flow to be measured passes;
   a magnetic float;
   means for mounting said magnetic float within said flow tube for movement within said flow tube in response to said fluid flow;
   a cylindrical magnet;
   means for mounting said cylindrical magnet in proximity to said magnetic float and outside said flow tube for rotational displacement of said cylindrical magnet in response to changes in the magnetic coupling between said magnetic float and said cylindrical magnet caused by movement of said magnetic float within said flow tube;
   a sensor responsive to rotational displacement of said cylindrical magnet for generating a voltage output signal having a sinusoidally varying amplitude dependent upon the angle of rotational displacement of said cylindrical magnet, said voltage output signal varying substantially linearly with said angle of rotational displacement of said cylindrical magnet over a limited range of rotational displacement of said cylindrical magnet;
   a collar within which said sensor is mounted and having a rotation axis parallel to the axis of rotation of said cylindrical magnet;
   and means for adjusting said collar for positioning said sensor in proximity to said cylindrical magnet and at a point on the circumference of said cylindrical magnet for producing said substantially linear voltage output signal for said limited range of rotation of said cylindrical magnet as said cylindrical magnet is rotationally displaced in response to movement of said magnetic float within said flow tube.

2. A flow meter according to claim 1 wherein said sensor is a Hall effect sensor.

3. A flow meter according to claim 2 wherein said magnetic float mounting means includes a shelf extending across said flow tube for holding said magnetic float at a predetermined point when there is no flow through the flow tube, said shelf having an opening through which said magnetic float extends and fluid can flow.

4. A flow meter according to claim 3 wherein said magnetic float has a tapered end and a finned end which meet at a junction which is approximately the size of the opening in said shelf.

* * * * *